(12) United States Patent
Kim et al.

(10) Patent No.: US 9,870,514 B2
(45) Date of Patent: Jan. 16, 2018

(54) HYPOTHESES LINE MAPPING AND VERIFICATION FOR 3D MAPS

(71) Applicant: QUALCOMM Incorporated, San Diego, CA (US)

(72) Inventors: Kiyoung Kim, Vienna (AT); Youngmin Park, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 14/791,205

(22) Filed: Jul. 2, 2015

(65) Prior Publication Data
US 2017/0004377 A1    Jan. 5, 2017

(51) Int. Cl.
| | |
|---|---|
| *G06T 15/00* | (2011.01) |
| *G06K 9/46* | (2006.01) |
| *G06T 7/543* | (2017.01) |
| *G06T 7/55* | (2017.01) |
| *G06K 9/52* | (2006.01) |
| *G06T 19/00* | (2011.01) |
| *G06T 19/20* | (2011.01) |
| *G06T 7/73* | (2017.01) |

(52) U.S. Cl.
CPC .......... *G06K 9/4604* (2013.01); *G06K 9/52* (2013.01); *G06T 7/543* (2017.01); *G06T 7/55* (2017.01); *G06T 7/73* (2017.01); *G06T 19/006* (2013.01); *G06T 19/20* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 6,434,277 B1 | 8/2002 | Yamada et al. | |
| 2010/0166294 A1 | 7/2010 | Marrion et al. | |
| 2010/0315412 A1 | 12/2010 | Sinha et al. | |
| 2013/0272578 A1 | 10/2013 | Watanabe | |
| 2014/0037189 A1* | 2/2014 | Ziegler | .......... G06T 17/00 382/154 |
| 2014/0133741 A1 | 5/2014 | Wang | |

OTHER PUBLICATIONS

Eade, et al., "Edge Landmarks in Monocular SLAM," Image Vis. Comput., 2008, pp. 1-10.
Klein, et al, "Improving the Agility of Keyframe-Based SLAM," Computer Vision—ECCV 2008, pp. 1-14.
(Continued)

*Primary Examiner* — Frank Chen
(74) *Attorney, Agent, or Firm* — Blakely, Sokoloff, Taylor & Zafman

(57) ABSTRACT

Disclosed are a device, apparatus, and method for performing line mapping. A three-dimensional (3D) map that includes at least a first and a second 3D line corresponding to an aspect of a real world environment may be obtained. One or more images of the aspect may also be obtained and hypotheses 3D lines may be determined. The hypothesis 3D lines may be verified with the one or more images and the 3D map may be updated. The determination and verification of the hypothesis 3D lines may include creating a plane in 3D space and using co-planarity or orthogonality assumptions.

24 Claims, 17 Drawing Sheets

(56) References Cited

OTHER PUBLICATIONS

Baillard C., et al., "A Plane-Sweep Strategy for the 3D Reconstruction of Buildings from Multiple Images", Jan. 1, 2000 (Jan. 1, 2000), pp. 1-16, XP055017531, Retrieved from the Internet: URL: http://www.robots.ox.ac.uk/-vgg/publications-new/Public/2000/Baillard00/baillard00.pdf [retrieved on Jan. 25, 2012].
International Search Report and Written Opinion—PCT/US2016/039088—ISA/EPO—Sep. 23, 2016.
Katartzis A., et al., "A Stochastic Framework for the Identification of Building Rooftops Using a Single Remote Sensing Image", IEEE Transactions on Geoscience and Remote Sensing, IEEE Service Center, Piscataway, NJ, US, vol. 46, No. 1, Jan. 1, 2008 (Jan. 1, 2008), pp. 259-271, XP011199113, ISSN: 0196-2892, DOI: 10.1109/TGRS.2007.904953.
Vandekerckhove J., et al., "Semi-Automatic Modelling of Urban Buildings From High Resolution Aerial Imagery", Computer Graphics International, 1998, Proceedings Hannover, Germany, Jun. 22-26, 1998, Los Alamitos, CA, USA, IEEE Computer Soceity, US, Jun. 22, 1998 (Jun. 22, 1998), pp. 588-596, XP010291495, DOI: 10.1109/CGI.1998.694317, ISBN: 978-0-8186-8445-6.

\* cited by examiner

HYPOTHESES LINE MAPPING AND VERIFICATION FOR 3D MAPS

TECHNICAL FIELD

This disclosure relates generally to computer vision based object recognition applications, and in particular but not exclusively, relates to 3-Dimensional (3D) line mapping.

BACKGROUND INFORMATION

A wide range of electronic devices, including mobile wireless communication devices, personal digital assistants (PDAs), laptop computers, desktop computers, digital cameras, digital recording devices, and the like, employ machine vision techniques to provide versatile imaging capabilities. These capabilities may include functions that assist users in recognizing landmarks, identifying friends and/or strangers, and a variety of other tasks.

Augmented reality (AR) systems have turned to model-based (e.g., 3D model) tracking algorithms or Simultaneous Localization And Mapping (SLAM) algorithms that are based on color or grayscale image data captured by a camera. SLAM algorithms may detect and track aspects of an environment (e.g., landmarks, and target objects) based on identifiable features within the environment. Some SLAM systems may use point-based feature selection for the detection and tracking of aspects/target objects. However, many environments (e.g., man-made environments) have abundant edges conducive for detecting edge-like features. The process of identifying and adding edge-like features to a 3D map of an environment is often referred to as line mapping. Typical line mapping systems, however, produce incomplete 3D lines because they often rely on the generation of at least three keyframes to triangulate one 3D line. The requirement to process three keyframes for one 3D line puts a heavy burden on devices with relatively low processing capability such as mobile devices.

BRIEF SUMMARY

Some embodiments discussed herein provide for improved (e.g., quicker) line mapping in a 3D mapping system. More particularly, embodiments discussed herein include the extension or generation of new 3D lines from existing 3D lines included in an existing 3D map. The processes discussed may generate new 3D lines by using small camera movement (i.e., few camera images instead of waiting for keyframe generation). In general, the process includes generating hypotheses 3D lines by observing the existing lines in the 3D map or from received images. The hypotheses 3D lines may be verified on one or more of the incoming images.

In one embodiment, a computer-implemented method of line mapping includes obtaining a three-dimensional (3D) map that includes at least a first and a second 3D line corresponding to one or more aspects of a real world environment and obtaining a first one or more images that include at least a portion of the one or more aspects. The method may also include generating one or more hypotheses 3D lines according to one or more of: the 3D map, the first one or more images, or a combination thereof. The method may also include obtaining a second one or more images that include at least a portion of the one or more aspects, where the second one or more images captured from a different position than the first one or more images. Additionally, the method may include verifying, from second one or more images, at least one of the one or more hypotheses 3D lines correspond to the one or more aspects.

In another embodiment, a computer-readable medium includes program code stored thereon for line mapping. In one embodiment, the program code includes instructions to: obtain a three-dimensional (3D) map that includes at least a first and a second 3D line corresponding to one or more aspects of a real world environment and obtain a first one or more images that include at least a portion of the one or more aspects. The instructions may also generate one or more hypotheses 3D lines according to one or more of: the 3D map, the first one or more images, or a combination thereof. The instructions may also obtain a second one or more images that include at least a portion of the one or more aspects, where the second one or more images captured from a different position than the first one or more images. Additionally, the instructions may verify, from second one or more images, at least one of the one or more hypotheses 3D lines correspond to the one or more aspects.

In yet another embodiment, a device includes memory coupled to a processing unit. The memory is adapted to store program code for line mapping and the processing unit is adapted to access and execute instructions included in the program code. When the instructions are executed by the processing unit, the processing unit directs the device to: obtain a three-dimensional (3D) map that includes at least a first and a second 3D line corresponding to one or more aspects of a real world environment and obtain a first one or more images that include at least a portion of the one or more aspects. The instructions may also generate one or more hypotheses 3D lines according to one or more of: the 3D map, the first one or more images, or a combination thereof. The instructions may also obtain a second one or more images that include at least a portion of the one or more aspects, where the second one or more images captured from a different position than the first one or more images. Additionally, the instructions may verify, from second one or more images, at least one of the one or more hypotheses 3D lines correspond to the one or more aspects.

In a further embodiment, an apparatus for line mapping, includes: means for obtaining a three-dimensional (3D) map that includes at least a first and a second 3D line corresponding to one or more aspects of a real world environment and means for obtaining a first one or more images that include at least a portion of the one or more aspects. The apparatus may also include means for generating one or more hypotheses 3D lines according to one or more of: the 3D map, the first one or more images, or a combination thereof. The apparatus may also include means for obtaining a second one or more images that include at least a portion of the one or more aspects, where the second one or more images captured from a different position than the first one or more images. Additionally, the apparatus may include means for verifying, from second one or more images, at least one of the one or more hypotheses 3D lines correspond to the one or more aspects.

The above and other embodiments, objects, and features of the present disclosure will become apparent from the following description of various embodiments, given in conjunction with the accompanying drawings.

DETAILED DESCRIPTION

Reference throughout this specification to "one embodiment", "an embodiment", "one example", or "an example" means that a particular feature, structure, or characteristic described in connection with the embodiment or example is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

In one embodiment, improved computer vision line mapping techniques described herein enables detection and/or tracking of one or more aspects (e.g., also referred to herein as objects or elements) of an environment (e.g., a real world environment). In one embodiment, by leveraging small camera movement from input images, 3D lines included in a 3D map (e.g., pre-existing lines in a predetermined or received map) are used to determine hypothesis 3D lines (e.g., new lines not identified or mapped in 3D space within the predetermined 3D map). The hypothesis 3D lines may be verified for accuracy according to input images. For example, the hypothesis 3D lines may be analyzed to determine whether they represent actual lines corresponding to the one or more detected or tracked aspects of the environment (e.g., target object or other elements of the environment). These and other features of the present disclosure are described in more detail below.

Figure 1A:
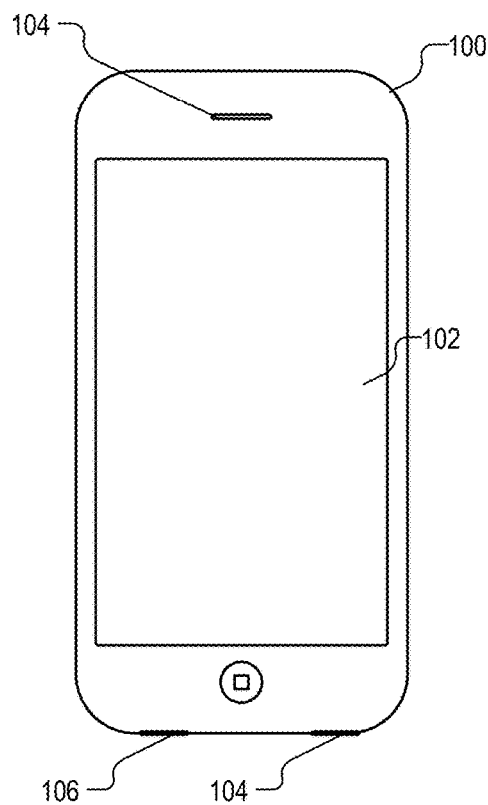
FIGS. 1A and 1B illustrate a front side and a backside, respectively, of a mobile platform capable of line mapping, in one embodiment.
Figure 1B:
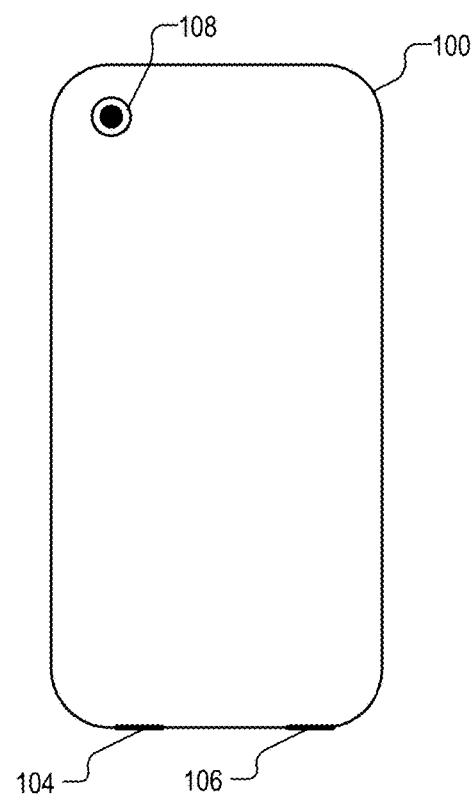

FIGS. 1A and 1B illustrate a front side and a back side, respectively, of a mobile platform/apparatus capable of line mapping. Mobile platform 100 is illustrated as including a display 102, speakers 104, and microphone 106. Mobile platform 100 further includes a camera 108 for capturing images of an environment. Mobile platform 100 may further include motion sensors (not shown), such as accelerometers, gyroscopes or the like, which may be used to assist in determining the pose of mobile platform 100 or equivalently the camera 108, which may have a known/calibrated position relationship to the motion sensors. The pose of mobile platform 100 may also or alternatively be determined using vision based tracking techniques.

As used herein, a mobile platform refers to any portable electronic device such as a cellular or other wireless communication device, personal communication system (PCS) device, personal navigation device (PND), Personal Information Manager (PIM), Personal Digital Assistant (PDA), tablet, wearable device, head mounted display (HMD) or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of performing augmented reality (AR) applications.

In AR applications, a real world object is imaged and displayed on a screen along with computer generated information, such as an image, a 3D virtual actor or textual information. In AR, the imaged real world objects may be detected and tracked in order to determine the camera's position and orientation (pose) information relative to the imaged real world objects. This information is used to correctly render the graphical object to be displayed along with the real-world object. The real world objects that are detected and tracked may be either two-dimensional (2D) or three-dimensional (3D) objects.

A significant challenge to enabling AR on mobile phones or other mobile platforms is the problem of estimating and tracking the camera pose accurately and in real-time. Pose tracking for AR applications has very demanding requirements: it must deliver full six degrees of freedom, give absolute measurements with respect to a given coordinate system, be very robust and run in real-time. Of interest are methods to compute pose using computer vision (CV) based approaches, which rely on first detecting and, subsequently, tracking one or more objects within the camera view.

In operation, a mobile platform implementing augmented reality may capture a first image of an aspect (e.g., landmark, target object, or element) of an environment (e.g., the local environment visible from a mobile platform camera viewpoint) while the mobile platform is in a first position relative to the aspect of the environment. The mobile platform may capture a second image including the aspect of the environment while the mobile platform is in a second position. Due to the movement of the mobile platform, the pose of the camera relative to the aspect of the environment may change. For example, movement of the mobile platform can translate to movement of the target object between the first and second images. This movement of the mobile platform results in a shifting of objects on display 102. Computer-generated AR graphics may be adjusted either by updating the angle of view or the size of the graphics. In various examples, the object movement may be caused by the actual object moving, the mobile platform moving, or a combination of both. The mobile platform can track object movement so that augmentations that are rendered remain in the proper location, size and perspective.

Edge detection and correspondence finding may be used for detecting the presence of a target object in an image and/or in the tracking of movement of the target object in AR applications. However, as mentioned above, typical line mapping systems, produce incomplete 3D lines because the heavy processing burden they impart on the mobile platform. For example, conventional 3D Mapping systems such as SLAM, often rely on the generation of at least three keyframes to triangulate a single line, which may be prohibitively slow and/or burdensome on the system.

In order to detect and/or track movement of a target object, embodiments of the present disclosure provide for improved (e.g., quicker) computer vision line mapping (e.g., real time mapping and tracking such as 3D SLAM or other systems). More particularly, embodiments discussed herein include the extension or generation of new 3D lines from existing 3D lines included in an existing 3D map. The processes discussed may generate new 3D lines by using small camera movement (i.e., few camera images instead of having to wait for keyframe generation). In general, the process includes generating hypotheses 3D lines by observing the existing lines in the 3D map. The hypotheses lines may be verified using one or more of the incoming images. Thus, embodiments of the present disclosure may include at least two distinct operations: (1) the generation of hypotheses 3D lines; and (2) the verification of those hypotheses 3D lines as actual lines corresponding to the target object. These and other features of the present disclosure are described in more detail below.

Figure 2:
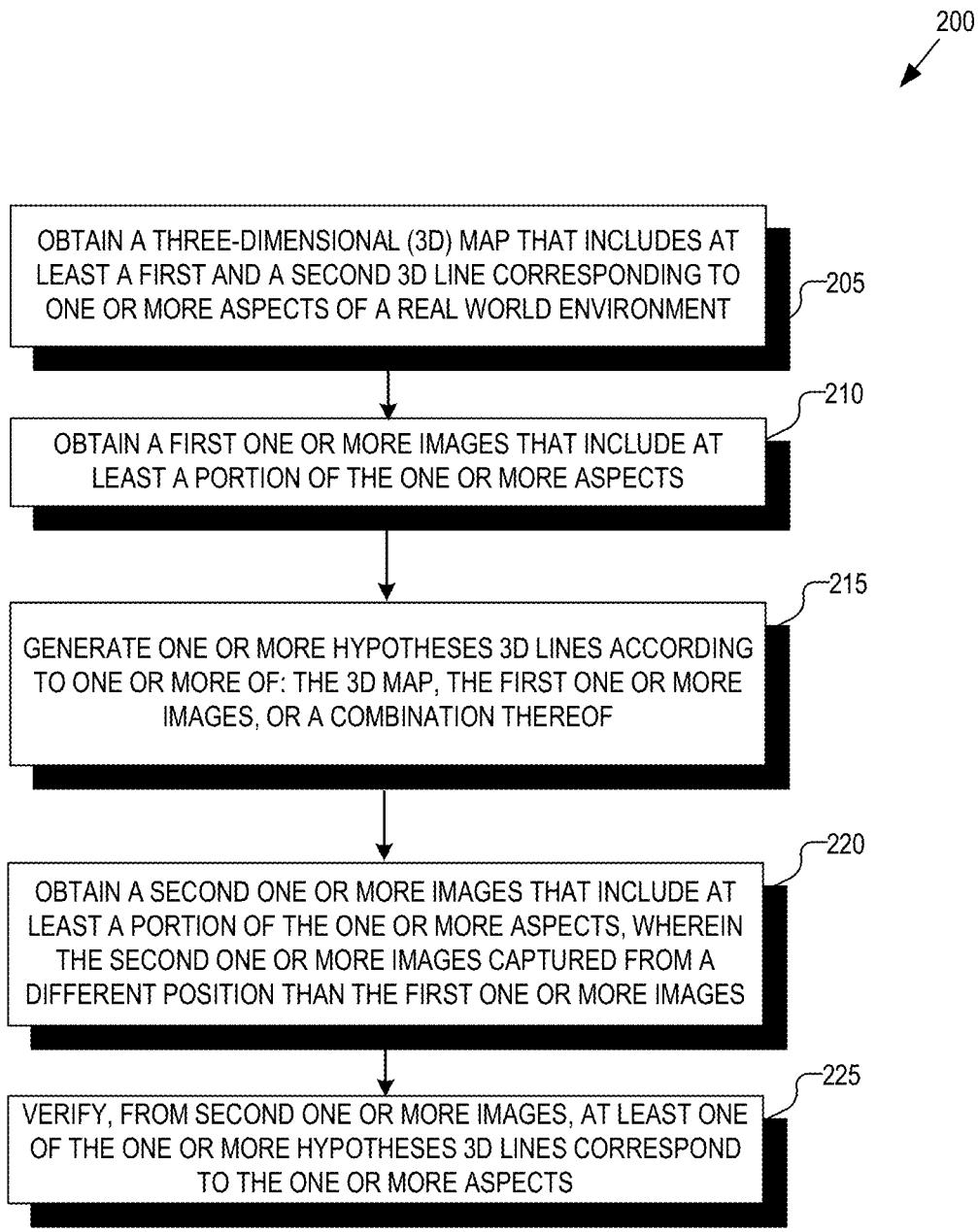
FIG. 2 is a flowchart illustrating a line mapping process, in one embodiment.

FIG. 2 is a flowchart illustrating a process 200 of line mapping. Process block 205 includes first obtaining 3D map that includes at least a first and a second 3D line corresponding to one or more aspects of a real world environment. For example, two pre-existing 3D lines that correspond to aspects (e.g., a target object) within the environment.

Process block 210 then includes obtaining a first one or more images that include at least a portion of the one or more aspects. For example, a device such as mobile platform 100 may receive images from a camera and the images may include a section of, or the entire target object or other aspect of the environment.

Process block 215 includes generating one or more hypotheses 3D lines according to one or more of: the 3D map, the first one or more images, or a combination thereof. For example, generating the hypotheses 3D lines may be based on an orthogonality assumption or based on a co-planarity assumption with respect to the existing 3D lines from the 3D map. That is, in one embodiment, hypotheses 3D lines may be generated such that they are assumed to be orthogonal to a plane defined by existing 3D lines, while in another embodiment, hypotheses 3D lines may be generated such that they are assumed to be co-planar to the plane defined by the existing 3D lines. In some embodiments, co-planarity assumption may extract hypothesis 3D lines from an image instead of or in addition to from the 3D map.

Process block 220 includes obtaining a second one or more images that include at least a portion of the one or more aspects, wherein the second one or more images captured from a different position than the first one or more images. For example, the images may be captured with the same camera sensor as the first one or more images from block 205. The viewpoint of the camera sensor may be different in position from the first one or more images, for example taken at a later point in time from the first one or more images. In one embodiment, the second one or more images may have a different pose than the first one or more images.

Process block 225 includes verifying, from second one or more images, at least one of the one or more hypotheses 3D lines correspond to the one or more aspects. For example, verification may include determining whether the hypothesis 3D lines actually correspond to the aspect or target object. Pre-existing lines may be observed over one or more captured images (e.g., the second one or more images) that include small camera movements (e.g., having a different position than the first one or more images) so as to verify the hypotheses lines. If the hypotheses lines are verified as corresponding to the aspect of the real world environment, the process may optionally update the 3D map data, such that the updated 3D map includes a representation of the newly generated and verified hypotheses 3D lines. For example, an updated 3D map may include 3D lines determined in response to successful verification of the hypothesis 3D lines as well as the pre-existing 3D lines that were part of the 3D map before hypothesis determination.

Figure 3A:
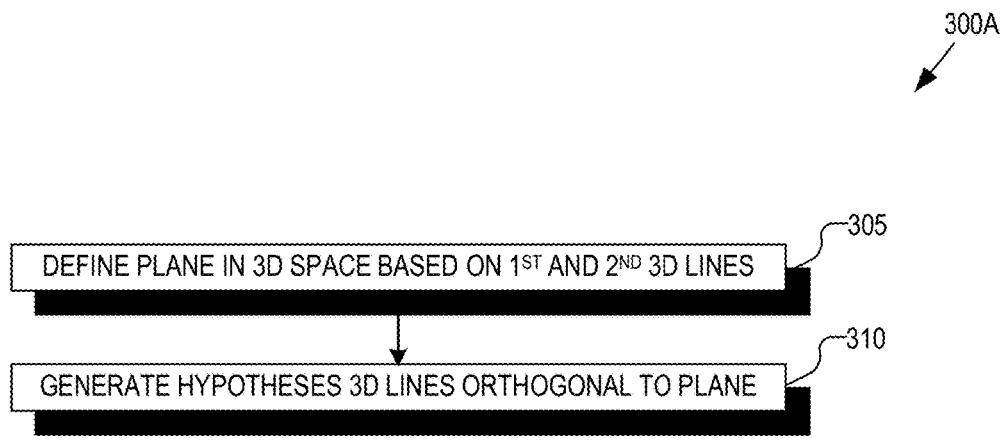
FIG. 3A is a flowchart illustrating a process 300A of generating hypotheses 3D lines based on an orthogonality assumption, in one embodiment.
Figure 4A:
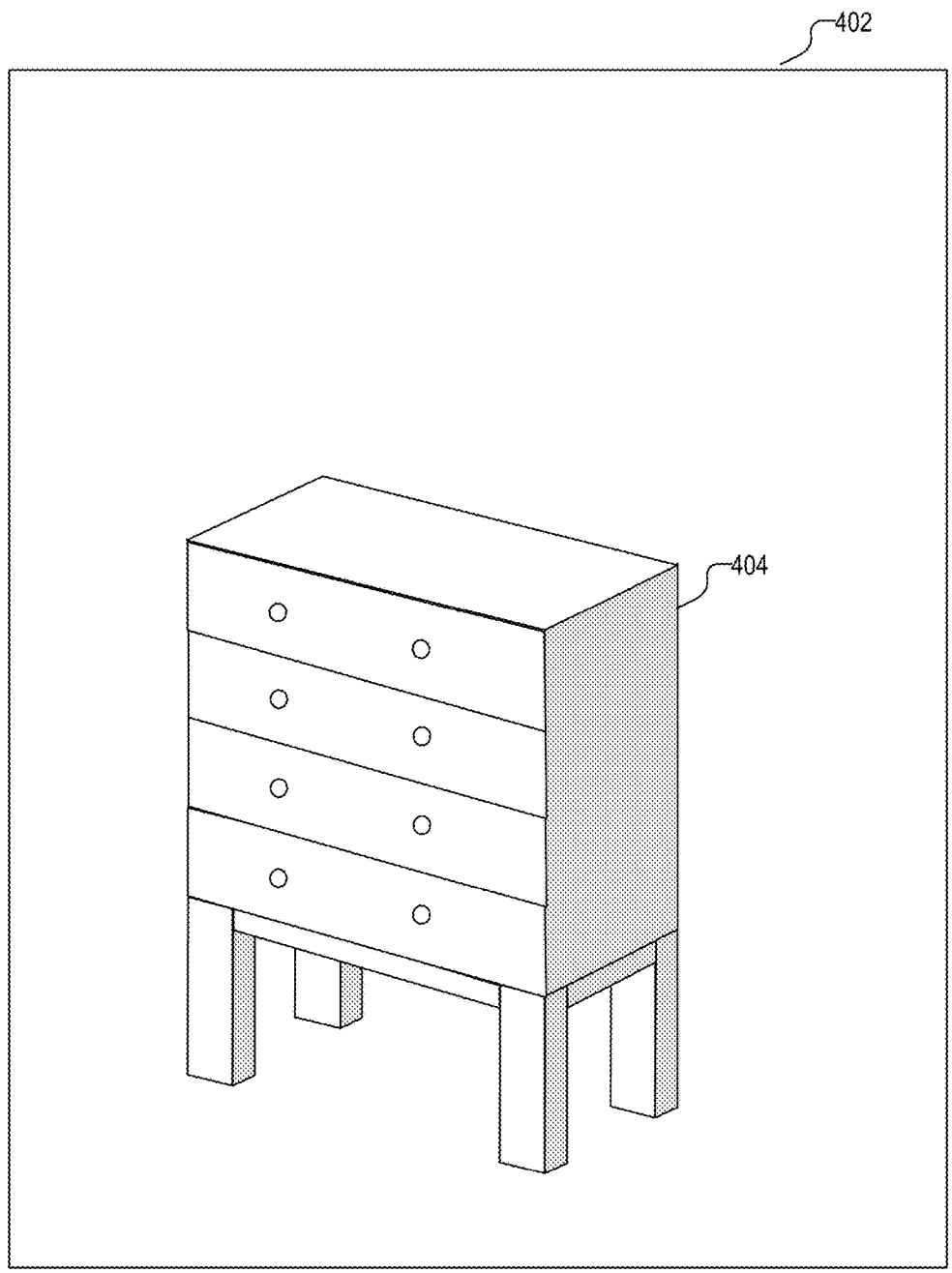
FIG. 4A illustrates an image of a target object, in one embodiment.
Figure 4B:
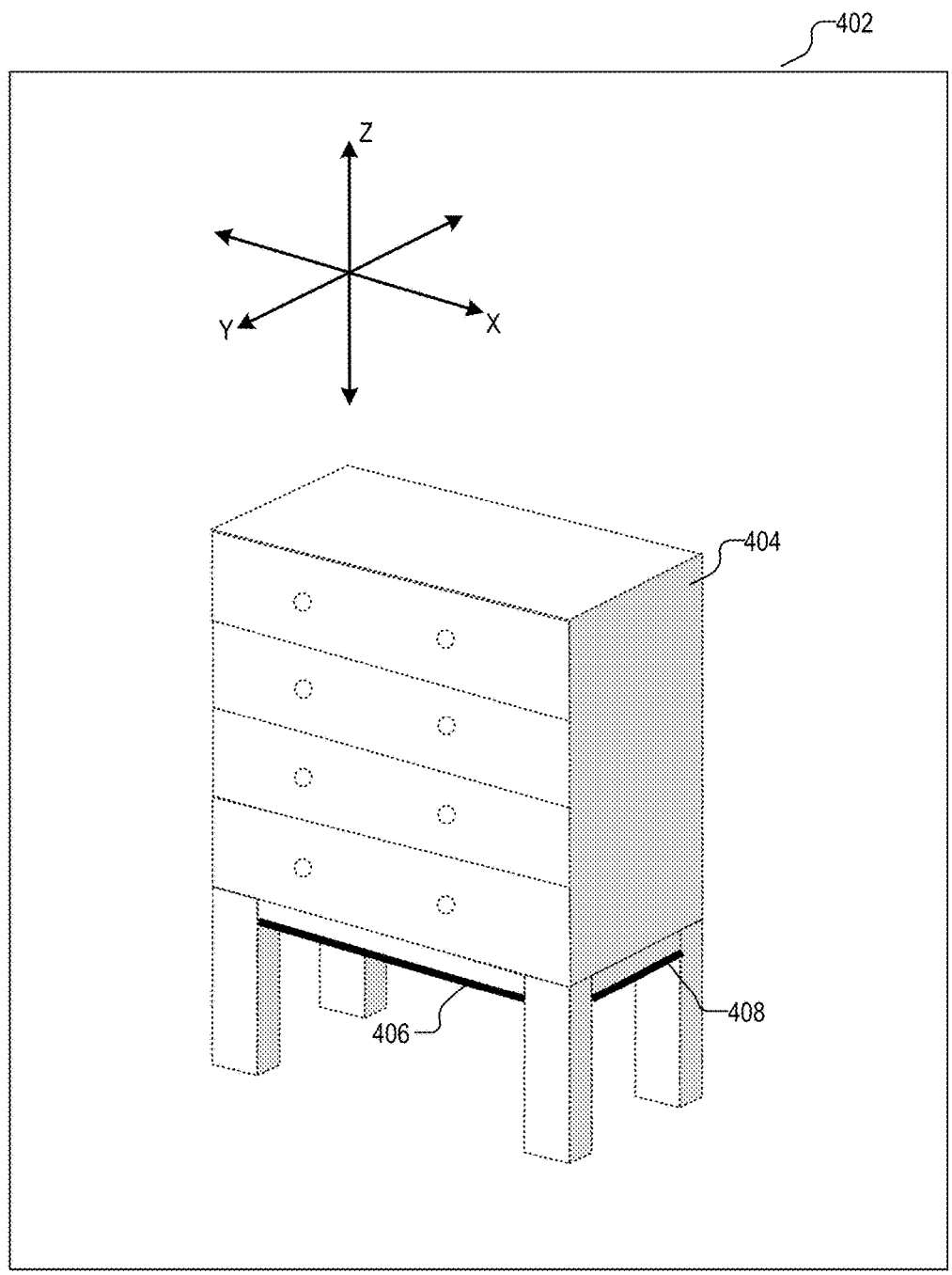
FIG. 4B illustrates a first and second pre-existing 3D lines of an existing 3D model corresponding to the target object, in one embodiment.
Figure 4C:
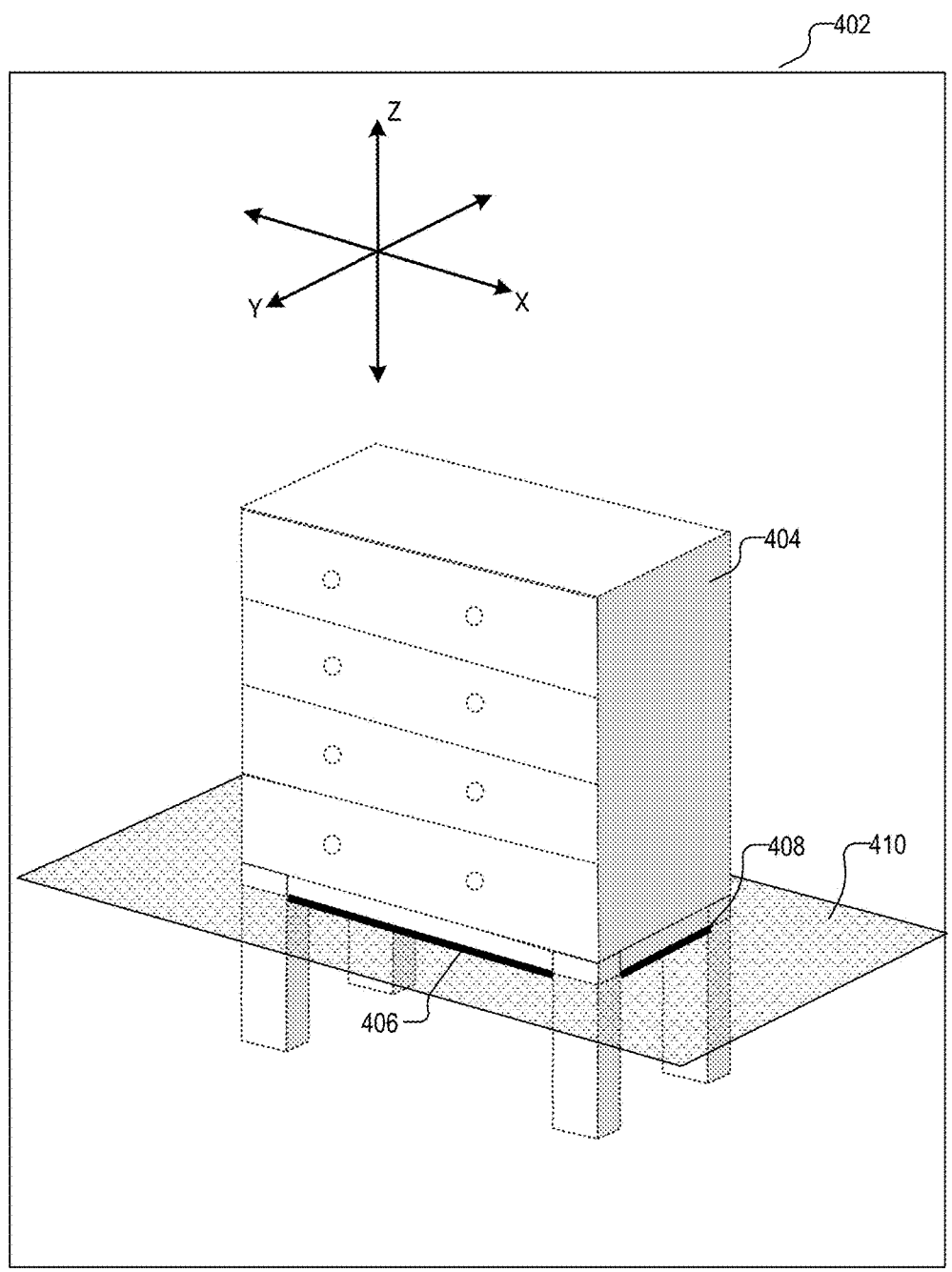
FIG. 4C illustrates a plane defined in 3D space based on the first and second 3D lines, in one embodiment.

FIG. 3A is a flowchart illustrating a process 300A of generating hypotheses 3D lines based on an orthogonality assumption, in one embodiment. Process 300A is one possible implementation of process block 210 of process 200. Process 300A represents a possible process of generating hypotheses 3D lines based on an orthogonality assumption. As shown in FIG. 3A, process block 305 includes defining a plane in 3D space based on the pre-existing lines included in the 3D map data. In one embodiment, the process of generating hypotheses 3D lines includes receiving a 3D map that contains at least two 3D lines that correspond to a target object. FIG. 4A illustrates an image 402 of a target object 404. FIG. 4B illustrates pre-existing 3D lines 406 and 408 that are contained in existing 3D map data of target object 404. The two 3D lines 406 and 408 are then used to define a plane 410 (FIG. 4C) in 3D space.

Figure 4D:
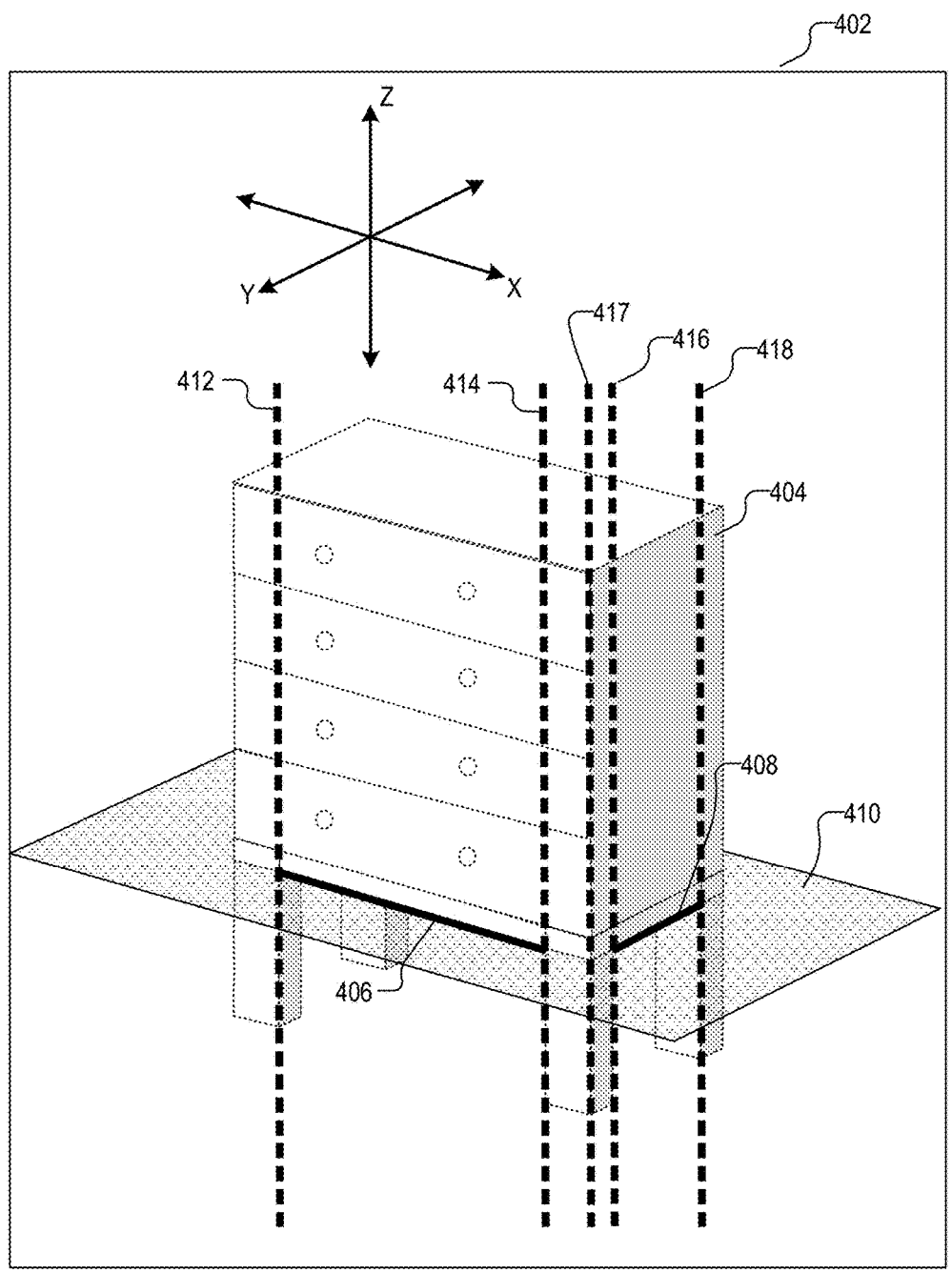
FIG. 4D illustrates several hypotheses 3D lines orthogonal to the defined plane, in one embodiment.

Hypotheses 3D lines may then be generated such that they are orthogonal to the plane 410 (i.e., process block 310 of FIG. 3A). For example, FIG. 4D illustrates hypotheses 3D lines 412-418 that are orthogonal to plane 410. In the illustrated example, hypotheses 3D lines 412 and 414 are generated at the ends of the line segment of line feature 406. Similarly, hypotheses 3D lines 416 and 418 are generated at the end of the line segment of 3D line 408. Hypotheses 3D lines 417 may be generated at a projected intersection of line 406 and line 408. In one embodiment, the hypotheses 3D lines may be generated by taking the cross product of the two existing lines 406 and 408.

Figure 3B:
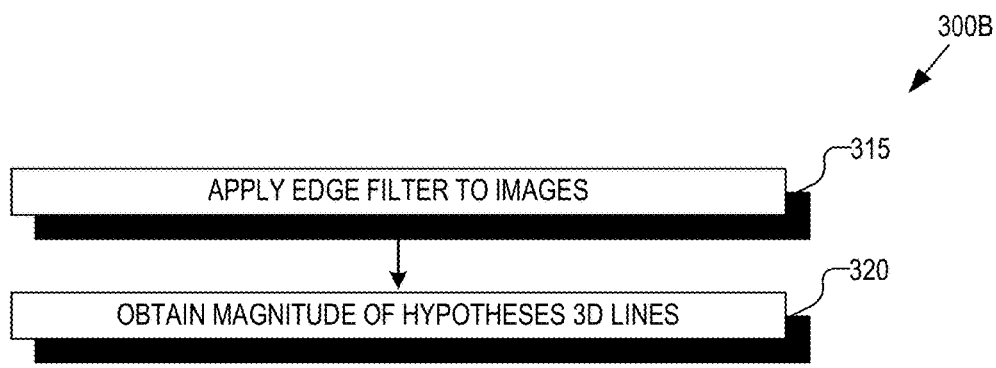
FIG. 3B is a flowchart illustrating a process 300B of verifying hypotheses 3D lines generated from an orthogonality assumption, in one embodiment.
Figure 4E:
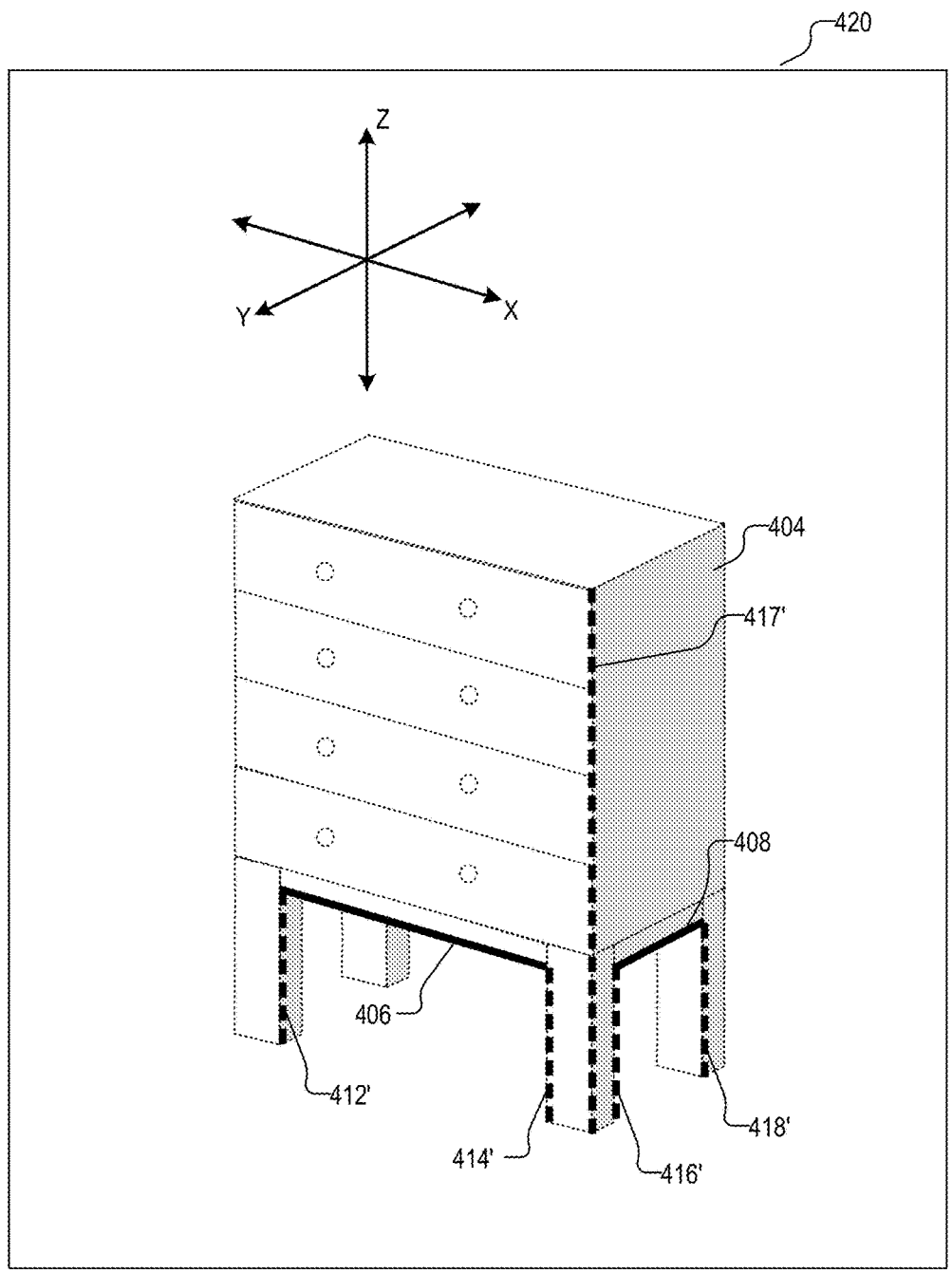
FIG. 4E illustrates the verified portions of the hypotheses 3D lines, in one embodiment.

FIG. 3B is a flowchart illustrating a process 300B of verifying hypotheses 3D lines generated from an orthogonality assumption, in one embodiment. Process 300B is one possible implementation of process block 220 of process 200. Process 300B represents one embodiment of verifying hypotheses 3D lines that were generated based on an orthogonality assumption. In one embodiment, one or more received images of the target object may be used to verify that the hypotheses 3D lines are actual lines to be added to the 3D map. The verification is to compute a real edge-score of the hypotheses 3D lines. In one embodiment, an edge filter, such as a Sobel filter, may be applied to the incoming images to emphasize any edges contained in the image (i.e., process block 315). One or more filtered images from varying poses may then be used to verify that the hypotheses 3D lines are actual lines. For example, the filtered image may be used to obtain a magnitude of the hypotheses 3D lines and/or to remove non-edge line features (i.e., process block 320). FIG. 4E illustrates the verified portions (412'-418') of the hypotheses 3D lines.

Figure 4F:
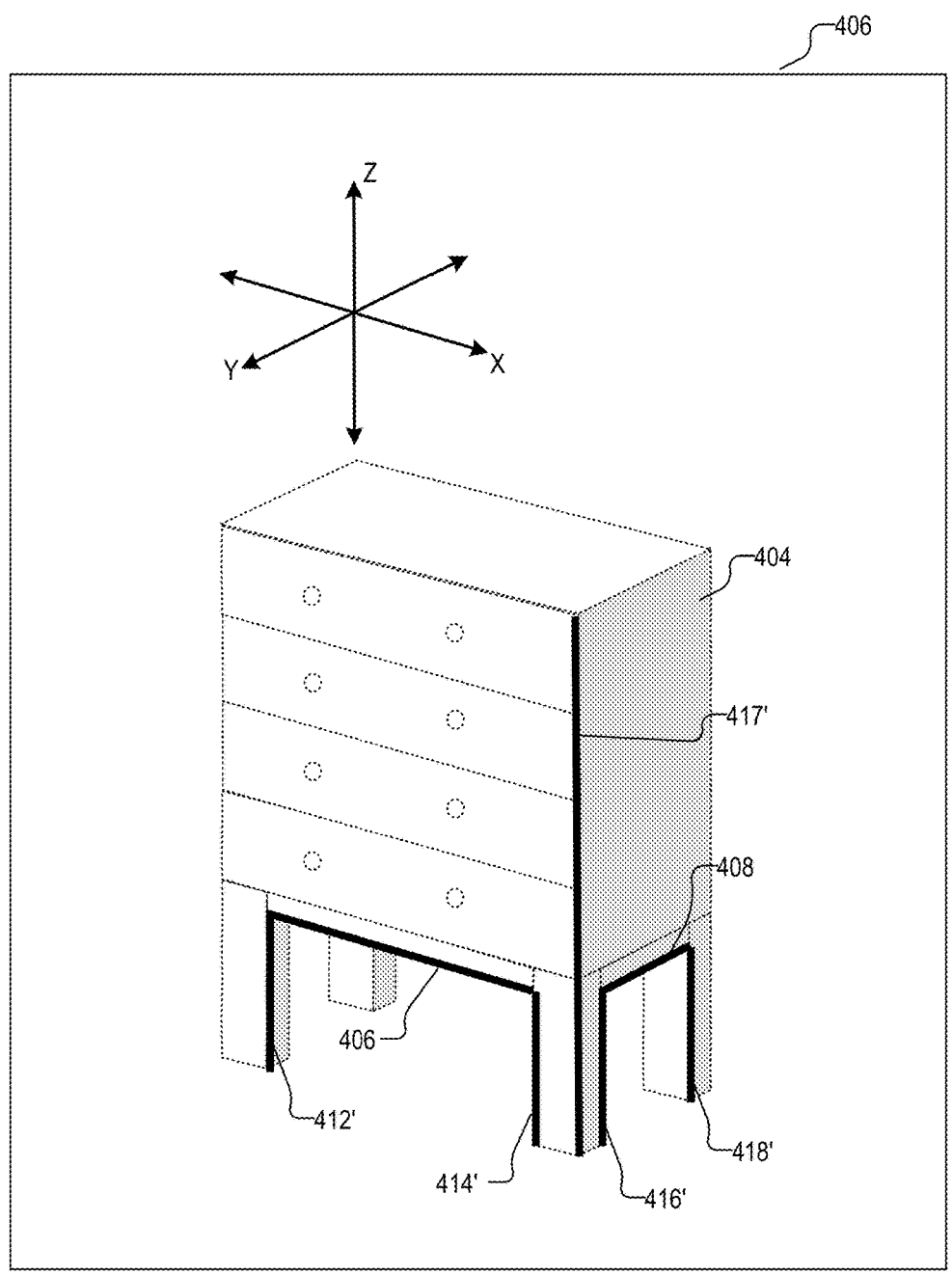
FIG. 4F illustrates 3D lines of an updated 3D map, in one embodiment.

As discussed above, the verified 3D lines may then be added to the 3D map data such that the 3D map now contains the previous 3D lines 406 and 408, as well as the newly generated 3D lines 412'-418' (FIG. 4F). The updated 3D map may then be used for future detection and tracking of the target object.

Figure 5A:
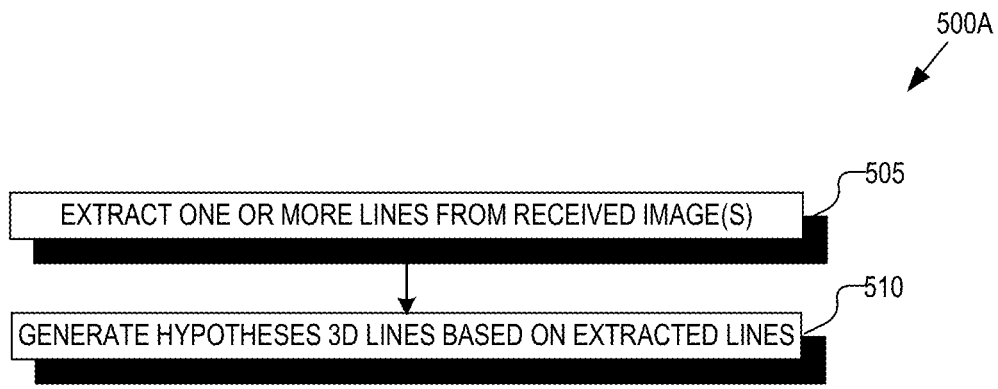
FIG. 5A is a flowchart illustrating a process of generating hypotheses 3D lines based on a co-planarity assumption, in one embodiment.

FIG. 5A is a flowchart illustrating a process 500A of generating hypotheses 3D lines based on a co-planarity assumption. Process 500A is one possible implementation of process block 210 from process 200. Process 500A represents a possible process of generating hypotheses 3D lines based on a co-planarity assumption. Process block 505 includes extracting one or more lines from one or more received images. For example, lines may be extracted from a received image with an associated camera pose (e.g., a current or previously obtained image). In some embodiments, instead of, or in addition to extracting hypothesis 3D lines from an image, the hypothesis 3D lines may be determined from an existing 3D map (e.g., the 3D map including reconstructed lines as described herein).

In one embodiment of 3D hypothesis line determination, a plane "P" (e.g., obtained from 3D map lines) is projected onto an image and the image's camera pose, (e.g., a current or a previously received image, where camera images are continuously received and the "previous image" is image right before the current image is displayed or buffered by the device) in order to determine whether an area "R" is planar (e.g., within a configurable or specified threshold). 2D lines may be detected within area "R" and back-projected with corresponding pose the 2D lines in order to determine 3D lines coordinates. When a next image is received, the hypothesis 3D lines may be verified (e.g., as described in the verification process herein).

Figure 6A:
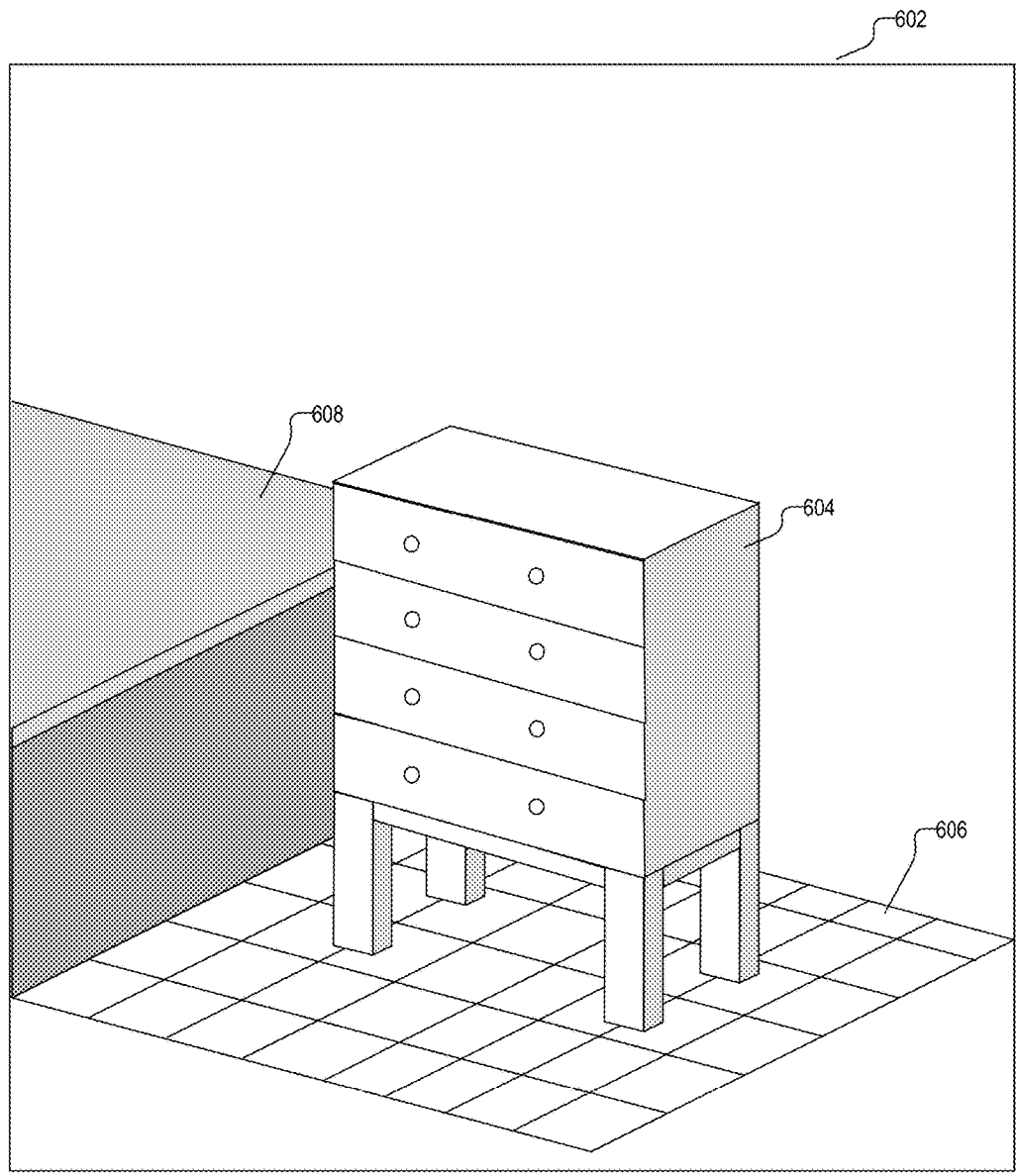
FIG. 6A illustrates an example image of a target and background objects.
Figure 6B:
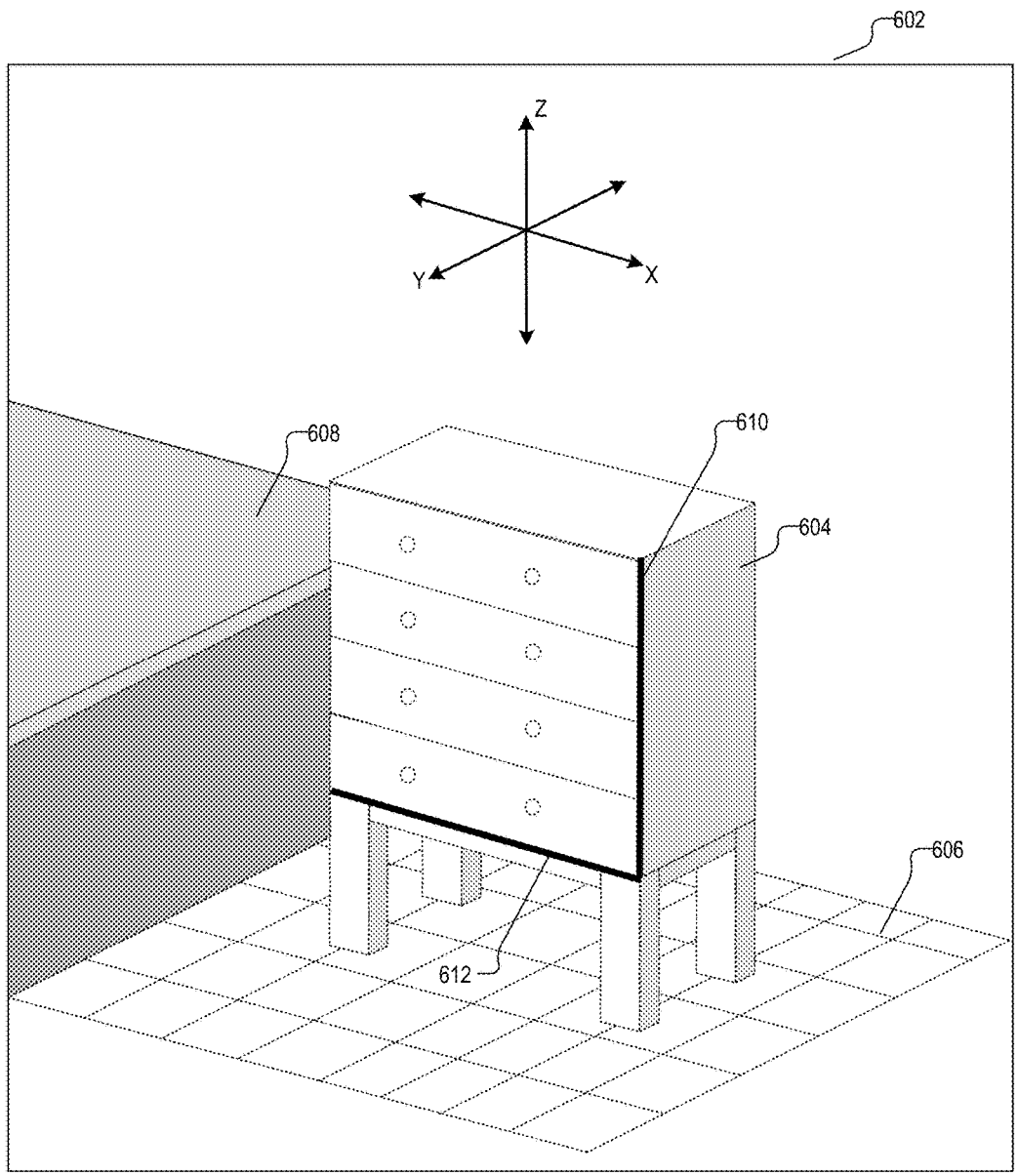
FIG. 6B illustrates a first and second pre-existing 3D lines of an existing 3D model corresponding to the target object, in one embodiment.
Figure 6C:
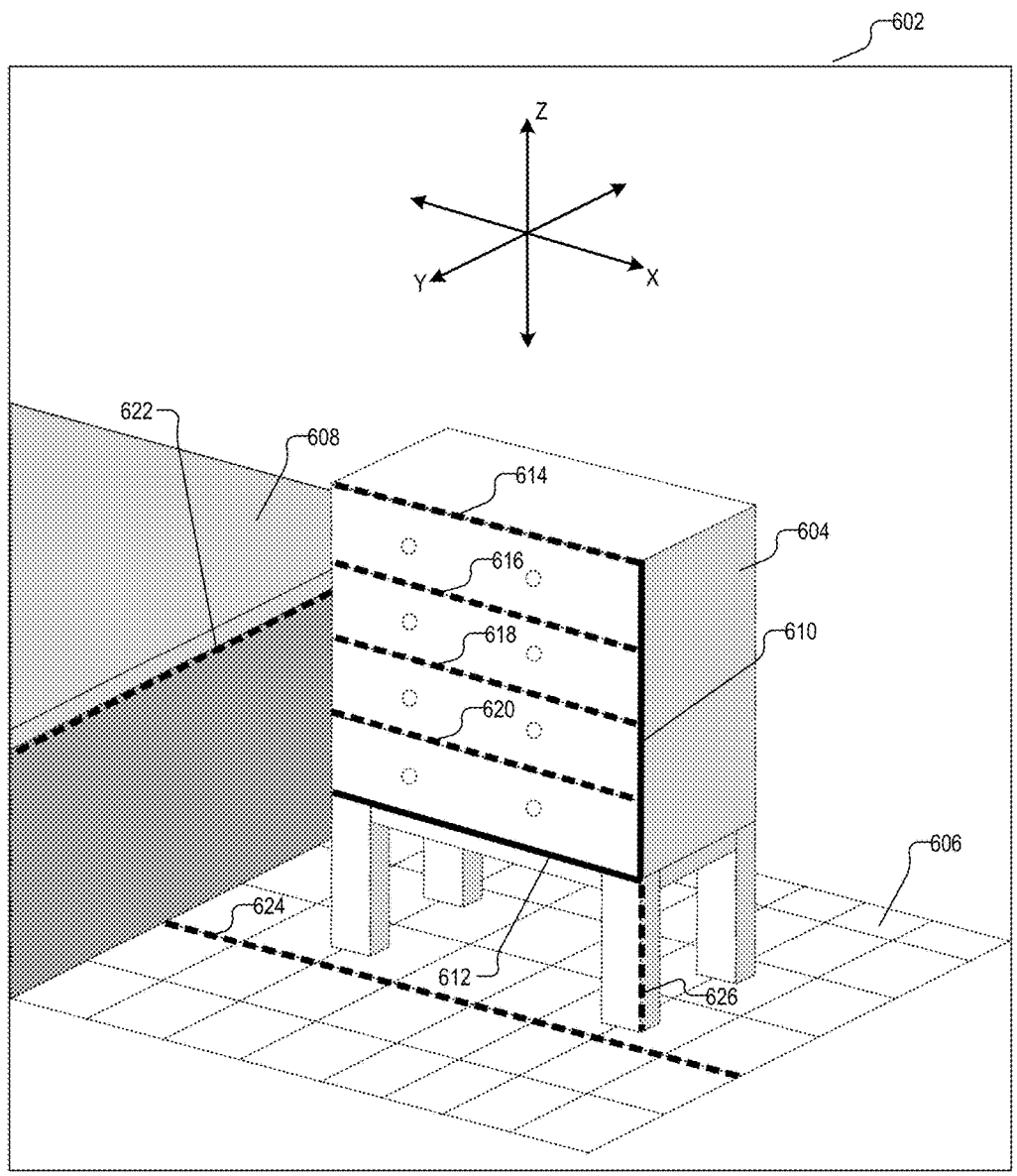
FIG. 6C illustrates hypotheses 3D lines generated based on a co-planarity assumption, in one embodiment.

For example, FIG. 6A illustrates an image 602 containing target object 604, as well as background objects 606 and 608. Each object can also be considered as, and referred to herein as, an aspect of the environment represented by image 602. FIG. 6B illustrates two existing or otherwise predetermined 3D lines 610 and 612 which are contained in an existing or otherwise predetermined 3D map of target object/aspect 604. In one embodiment, image 602 is processed (i.e., process block 505) to detect one or more lines contained in the image. For example, image 602 may be processed with a Sobel edge filter, or other filter. FIG. 6C illustrates several detected lines 614-624. In one embodiment, a detected line must have a line segment length greater than a minimum threshold in order to be considered a hypothesis 3D line. The detected lines 614-626 may then be considered hypotheses 3D lines by assuming that they are co-planar with existing 3D lines 610 and 612 (i.e., process block 510).

Figure 5B:
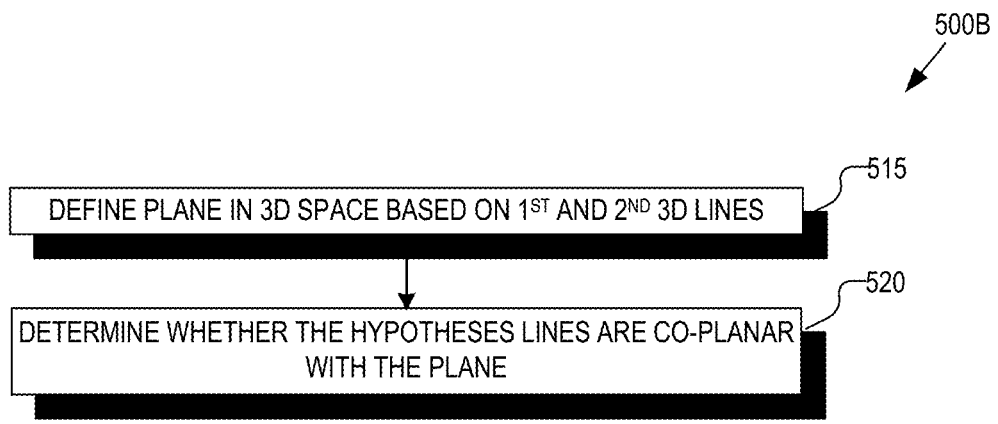
FIG. 5B is a flowchart illustrating a process of verifying hypotheses 3D lines that were generated based on the co-planarity assumption, in one embodiment.
Figure 6D:
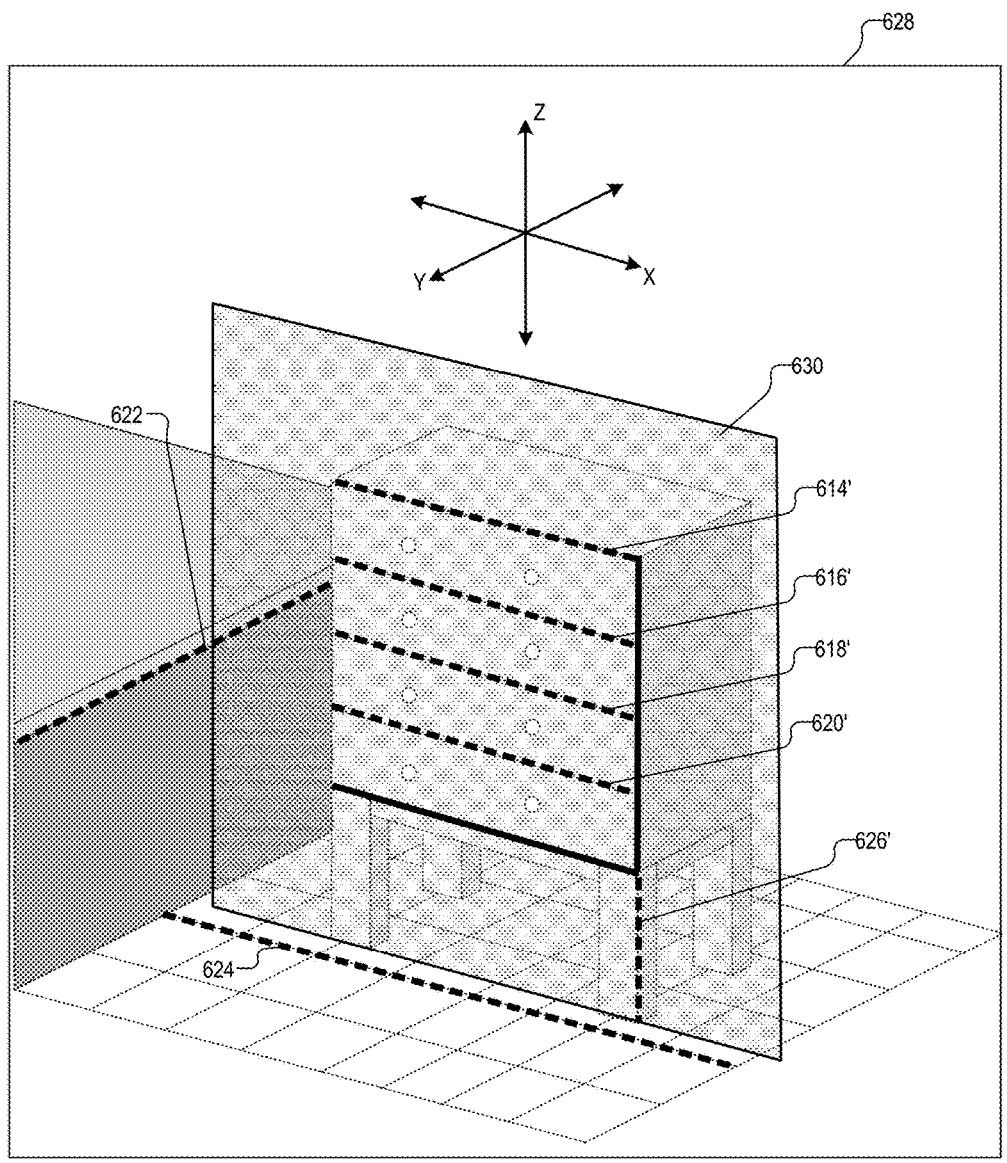
FIG. 6D illustrates a plane defined in 3D space based on the first and second 3D lines, in one embodiment.

FIG. 5B is a flowchart illustrating a process 500B of verifying hypotheses 3D lines that were generated based on the co-planarity assumption, in one embodiment. Process 500B is one possible implementation of process block 220 of process 200. Process 500B represents one embodiment of verifying hypotheses 3D lines that were generated based on the co-planarity assumption. Process block 515 includes defining a plane in 3D space based on the pre-existing 3D lines. For example, FIG. 6D illustrates defining a plane 630 based on the existing 3D lines 610 and 612.

Figure 6E:
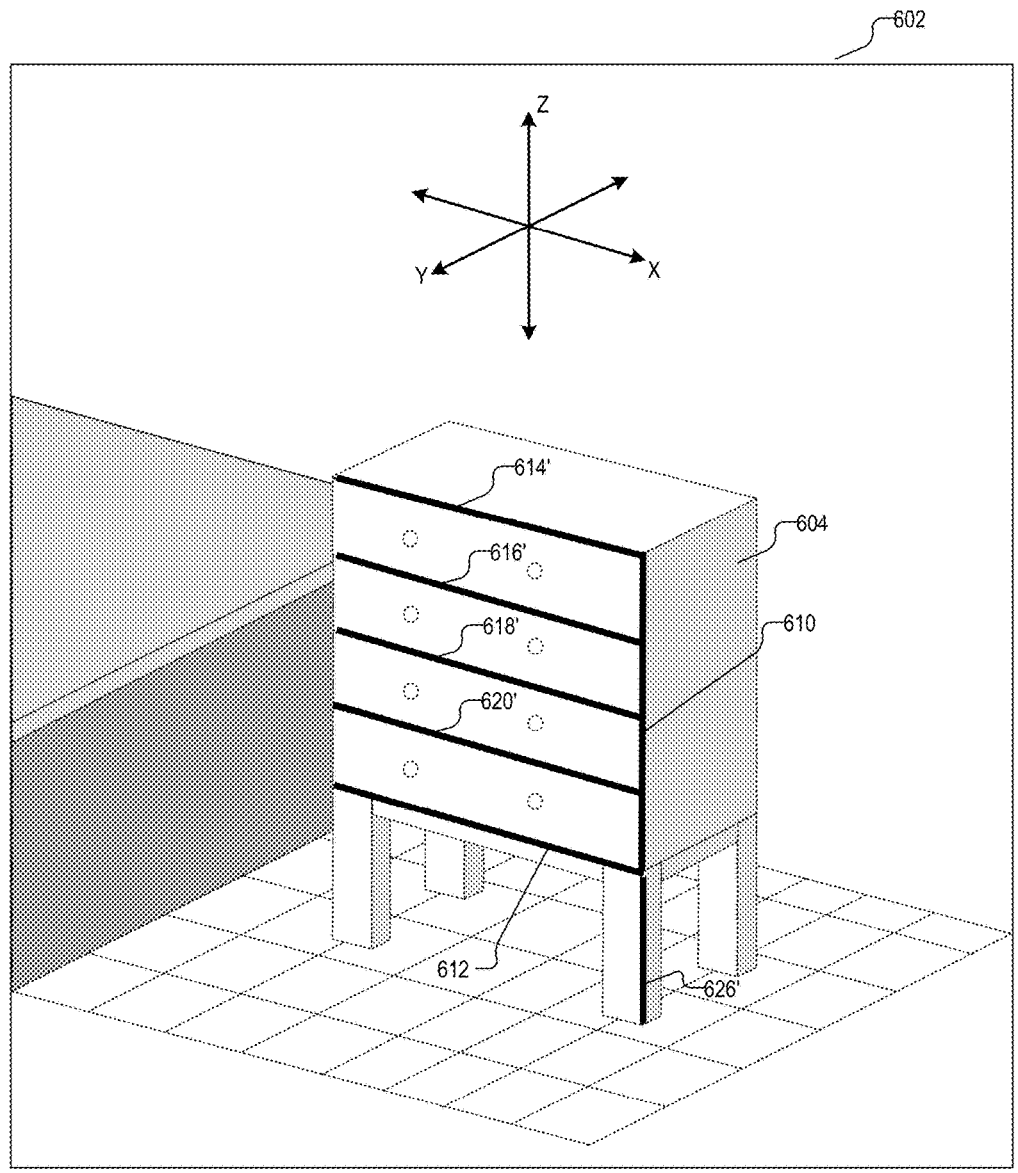
FIG. 6E illustrates pre-existing as well as the verified 3D lines of an updated 3D map, in one embodiment.

Process block 520 then includes determining whether the hypotheses 3D lines are indeed co-planar with the defined plane. One or more images of the target object from varying poses may be used to verify whether the hypotheses 3D lines are indeed located in plane 630. As shown in FIG. 6D, hypotheses 3D lines 622 and 624 are not located on plane 630 and thus, may be disregarded. However, 3D lines 614-620 and 626 are indeed co-planar with plane 630 and are thus verified as actual 3D lines 614'-620' and 626'. FIG. 6E illustrates 3D lines of the updated 3D map that now contains pre-existing 3D lines 610 and 612, as well as verified 3D lines 614'-620' and 626'.

Figure 7:
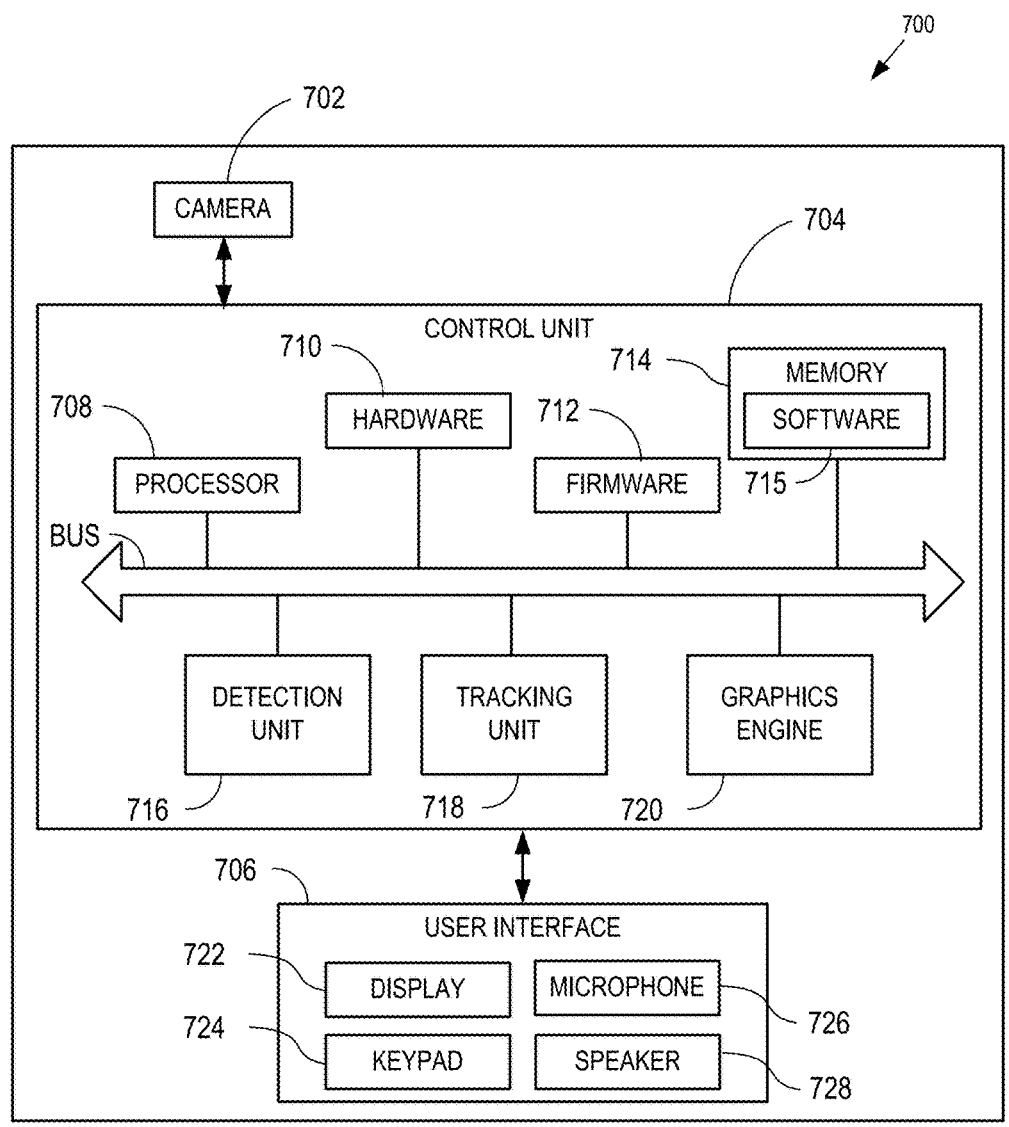
FIG. 7 is a functional block diagram of an embodiment of a device capable of performing the processes discussed herein.

FIG. 7 is a functional block diagram of a device 700 capable of performing the processes discussed herein. Device 700 is one possible implementation of mobile platform 100 of FIGS. 1A and 1B. Device 700 may also be a device including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Device 700 may also encompass all electronic devices which are capable of augmented reality (AR), virtual reality (VR), and/or mixed reality (MR) applications.

Device 700 may optionally include a camera 702 as well as an optional user interface 706 that includes the display 722 capable of displaying images captured by the camera 702. User interface 706 may also include a keypad 724 or other input device through which the user can input information into the device 700. If desired, the keypad 724 may be obviated by integrating a virtual keypad into the display 722 with a touch sensor. User interface 706 may also include a microphone 726 and speaker 728.

Device 700 also includes a control unit 704 that is connected to and communicates with the camera 702 and user interface 706, if present. The control unit 704 accepts and processes images received from the camera 702 and/or from network adapter 716. Control unit 704 may be provided by a processing unit 708 and associated memory 714, hardware 710, software 715, and firmware 712.

Control unit 704 may further include a graphics engine 720, which may be, e.g., a gaming engine, to render desired data in the display 722, if desired. Processing unit 708 and graphics engine 720 are illustrated separately for clarity, but may be a single unit and/or implemented in the processing unit 708 based on instructions in the software 715 which is run in the processing unit 708. Processing unit 708, as well as the graphics engine 720 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware.

Moreover, as used herein the term "memory" refers to any type of computer storage medium (i.e., a machine readable non-transitory storage medium), including long term, short term, or other memory associated with device 700, and is not to be limited to any particular type of memory or number of memories, or type of media upon which memory is stored.

The processes described herein may be implemented by various means depending upon the application. For example, these processes may be implemented in hardware 710, firmware 712, software 715, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 714 and executed by the processing unit 708. Memory may be implemented within or external to the processing unit 708.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
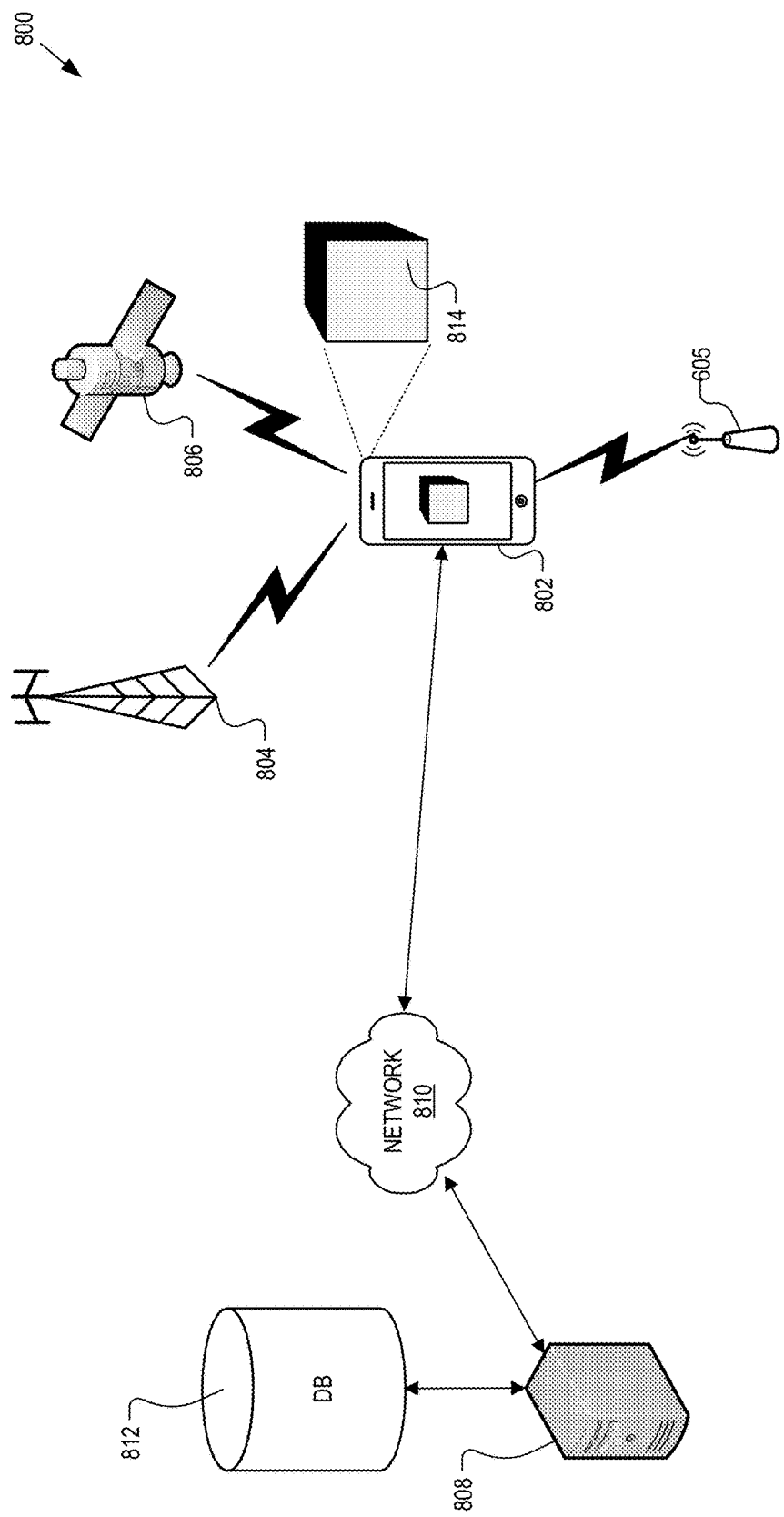
FIG. 8 is a functional block diagram of an exemplary image processing system capable of performing the processes discussed herein.

FIG. 8 is a functional block diagram of an image processing system 800. As shown, image processing system 800 includes an example mobile platform 802 that includes a camera (not shown in current view) capable of capturing images of a scene including object 814. Database 812 may include data, including existing 3D lines of target object 814.

The mobile platform 802 may include a display to show images captured by the camera. The mobile platform 802 may also be used for navigation based on, e.g., determining its latitude and longitude using signals from a satellite positioning system (SPS), which includes satellite vehicle(s) 806, or any other appropriate source for determining position including cellular tower(s) 804 or wireless communication access points 805. The mobile platform 802 may also include orientation sensors, such as a digital compass, accelerometers or gyroscopes, that can be used to determine the orientation of the mobile platform 802.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 806. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain embodiments, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile platform 802 is not limited to use with an SPS for position determination, as position determination techniques may be implemented in conjunction with various wireless communication networks, including cellular towers 804 and from wireless communication access points 805, such as a wireless wide area network (WWAN), a wireless local area network (WLAN), a wireless personal area network (WPAN). Further the mobile platform 802 may access one or more servers 808 to obtain data, such as 3D map data containing existing 3D lines from a database 812, using various wireless communication networks via cellular towers 804 and from wireless communication access points 805, or using satellite vehicles 806, if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP).

Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As shown in FIG. 8, system 800 includes mobile platform 802 capturing an image of object 814 to be tracked using SLAM (or other tracking system). As illustrated, the mobile platform 802 may access a network 810, such as a wireless wide area network (WWAN), e.g., via cellular tower 804 or wireless communication access point 805, which is coupled to a server 808, which is connected to database 812 that stores information related to target objects and may also include 3D map data having pre-existing 3D lines corresponding to the target object. While FIG. 8 shows one server 808, it should be understood that multiple servers may be used, as well as multiple databases 812. Mobile platform 802 may perform the object tracking itself, as illustrated in FIG. 8, by obtaining at least a portion of the database 812 from server 808 and storing the downloaded map data in a local database inside the mobile platform 802. The portion of a database obtained from server 808 may be based on the mobile platform's geographic location as determined by the mobile platform's positioning system. Moreover, the portion of the database obtained from server 808 may depend upon the particular application that requires the database on the mobile platform 802. By downloading a small portion of the database 812 based on the mobile platform's geographic location and performing the object detection on the mobile platform 802, network latency issues may be avoided and the over the air (OTA) bandwidth usage is reduced along with memory requirements on the client (i.e., mobile platform) side. If desired, however, the object detection and tracking may be performed by the server 808 (or other server), where either the image itself or the extracted features from the image are provided to the server 808 by the mobile platform 802.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method of line mapping, the method comprising:
    obtaining a three-dimensional (3D) map that includes at least a first and a second 3D line corresponding to one or more aspects of a real world environment;
    obtaining a first one or more images that include at least a portion of the one or more aspects;
    generating one or more hypotheses 3D lines according to a combination of the 3D map and the first one or more images;
    obtaining a second one or more images that include at least a portion of the one or more aspects, wherein the second one or more images captured from a different position than the first one or more images; and
    verifying, from second one or more images, at least one of the one or more hypotheses 3D lines correspond to the one or more aspects, wherein verifying the one or more hypotheses 3D lines correspond to the aspect comprises applying an edge filter to the second one or more images to obtain a magnitude of the one or more hypotheses 3D lines.

2. The method of claim 1, further comprising:
    updating, in response to a successful verification of the one or more hypotheses 3D lines, the 3D map to include the one or more hypotheses 3D lines.

3. The method of claim 1, wherein generating one or more hypotheses 3D lines comprises:
    defining a plane in 3D space based on the first 3D line and the second 3D line;
    identifying one or more 3D lines orthogonal to the plane; and
    selecting one or more of the 3D lines orthogonal to the plane as the one or more hypotheses 3D lines.

4. The method of claim 1, wherein applying the edge filter includes applying a Sobel edge filter.

5. The method of claim 1, wherein generating the one or more hypotheses 3D lines includes extracting one or more lines from the first one or more images, and wherein the hypotheses 3D lines are based on the extracted one or more lines.

6. The method of claim 5, wherein verifying that the one or more hypotheses 3D lines correspond to the aspect includes:
    defining a plane in 3D space based on the first 3D line and the second 3D line; and
    determining whether the one or more hypotheses 3D lines are co-planar with the plane.

7. A machine readable non-transitory storage medium having stored line mapping program instructions executable by a processor to:
    obtain a three-dimensional (3D) map that includes at least a first and a second 3D line corresponding to one or more aspects of a real world environment;
    obtain a first one or more images that include at least a portion of the one or more aspects;
    generate one or more hypotheses 3D lines according to a combination of the 3D map and the first one or more images;
    obtain a second one or more images that include at least a portion of the one or more aspects, wherein the second one or more images captured from a different position than the first one or more images; and verify, from second one or more images, at least one of the one or more hypotheses 3D lines correspond to the one or more aspects, wherein the instructions to verify the one or more hypotheses 3D lines correspond to the aspect comprises instructions to apply an edge filter to the one or more images to obtain a magnitude of the one or more hypotheses 3D lines.

8. The medium of claim 7, further comprising instructions to:
update, in response to a successful verification of the one or more hypotheses 3D lines, the 3D map to include the one or more hypotheses 3D lines.

9. The medium of claim 7, wherein the instructions to generate one or more hypotheses 3D lines includes instructions to:
define a plane in 3D space based on the first 3D line and the second 3D line;
identify one or more 3D lines orthogonal to the plane; and
select one or more of the 3D lines orthogonal to the plane as the one or more hypotheses 3D lines.

10. The medium of claim 7, wherein the instructions to apply the edge filter includes instructions to apply a Sobel edge filter.

11. The medium of claim 7, wherein the instructions to generate the one or more hypotheses 3D lines includes instructions to extract one or more lines from the one or more images, and wherein the hypotheses 3D lines are based on the extracted one or more lines.

12. The medium of claim 11, wherein the instructions to verify that the one or more hypotheses 3D lines correspond to the aspect includes instructions to:
define a plane in 3D space based on the first 3D line and the second 3D line; and
determine whether the one or more hypotheses 3D lines are co-planar with the plane.

13. A device for line mapping, comprising:
memory;
a processor coupled to the memory and configured to:
obtain a three-dimensional (3D) map that includes at least a first and a second 3D line corresponding to one or more aspects of a real world environment;
obtain a first one or more images that include at least a portion of the one or more aspects;
generate one or more hypotheses 3D lines according to a combination of the 3D map and the first one or more images;
obtain a second one or more images that include at least a portion of the one or more aspects, wherein the second one or more images captured from a different position than the first one or more images; and
verify, from second one or more images, at least one of the one or more hypotheses 3D lines correspond to the one or more aspects, wherein the instructions to verify the one or more hypotheses 3D lines correspond to the aspect comprises instructions to apply an edge filter to the one or more images to obtain a magnitude of the one or more hypotheses 3D lines.

14. The device of claim 13, further comprising instructions to:
update, in response to a successful verification of the one or more hypotheses 3D lines, the 3D map to include the one or more hypotheses 3D lines.

15. The device of claim 13, wherein the instructions to process the first 3D line and the second 3D line comprises instructions to:
define a plane in 3D space based on the first 3D line and the second 3D line;
identify one or more 3D lines orthogonal to the plane; and
select one or more of the 3D lines orthogonal to the plane as the one or more hypotheses 3D lines.

16. The device of claim 13, wherein the instructions to apply the edge filter includes instructions to apply a Sobel edge filter.

17. The device of claim 13, wherein the instructions to determine the one or more hypotheses 3D lines includes instructions to extract one or more lines from the one or more images, and wherein the hypotheses 3D lines are based on the extracted one or more lines.

18. The device of claim 17, wherein the instructions to verify that the one or more hypotheses 3D lines correspond to the aspect includes instructions to:
define a plane in 3D space based on the first 3D line and the second 3D line; and
determine whether the one or more hypotheses 3D lines are co-planar with the plane.

19. An apparatus for performing line mapping, the apparatus comprising:
means for obtaining a three-dimensional (3D) map that includes at least a first and a second 3D line corresponding to one or more aspects of a real world environment;
means for obtaining a first one or more images that include at least a portion of the one or more aspects;
means for generating one or more hypotheses 3D lines according to a combination of the 3D map and the first one or more images;
means for obtaining a second one or more images that include at least a portion of the one or more aspects, wherein the second one or more images captured from a different position than the first one or more images; and
means for verifying, from second one or more images, at least one of the one or more hypotheses 3D lines correspond to the one or more aspects, wherein the means for verifying the one or more hypotheses 3D lines correspond to the aspect comprises means for applying an edge filter to the one or more images to obtain a magnitude of the one or more hypotheses 3D lines.

20. The apparatus of claim 19, further comprising:
means for updating, in response to a successful verification of the one or more hypotheses 3D lines, the 3D map to include the one or more hypotheses 3D lines.

21. The apparatus of claim 19, wherein the means for generating the one or more hypotheses 3D lines comprises:
means for defining a plane in 3D space based on the first 3D line and the second 3D line;
means for identifying one or more 3D lines orthogonal to the plane; and
means for selecting one or more of the 3D lines orthogonal to the plane as the one or more hypotheses 3D lines.

22. The apparatus of claim 19, wherein the means for applying the edge filter includes means for applying a Sobel edge filter.

23. The apparatus of claim 19, wherein the means for generating the one or more hypotheses 3D lines includes means for extracting one or more lines from the one or more images, and wherein the hypotheses 3D lines are based on the extracted one or more lines.

24. The apparatus of claim 23, wherein verifying that the one or more hypotheses 3D lines correspond to the aspect includes:
means for defining a plane in 3D space based on the first 3D line and the second 3D line; and means for determining whether the one or more hypotheses 3D lines are co-planar with the plane.

\* \* \* \* \*